United States Patent
Kawakami et al.

(10) Patent No.: US 6,596,432 B2
(45) Date of Patent: *Jul. 22, 2003

(54) RECHARGEABLE BATTERIES

(75) Inventors: Soichiro Kawakami, Nara (JP); Shinya Mishina, Nara (JP); Naoya Kobayashi, Nara (JP); Masaya Asao, Kyoto (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/453,878

(22) Filed: May 30, 1995

(65) Prior Publication Data

US 2002/0064710 A1 May 30, 2002

(30) Foreign Application Priority Data

May 30, 1994 (JP) .............................. 6-116732

(51) Int. Cl.[7] .................................. H01M 2/32
(52) U.S. Cl. ..................... 429/60; 429/208; 429/246
(58) Field of Search ............................... 429/246, 207, 429/208, 60, 127, 128, 218

(56) References Cited

U.S. PATENT DOCUMENTS 5,549,717 A * 8/1996 Takeuchi et al. ............ 29/623.2

FOREIGN PATENT DOCUMENTS

| JP | 63-13264 | 1/1988 | ............ H01M/4/40 |
| JP | 63114057 | 5/1988 | ............ H01M/4/02 |
| JP | 2-150760 | 12/1990 | |
| JP | 3-152881 | 6/1991 | |
| JP | 5-47381 | 2/1993 | ............ H01M/4/40 |
| JP | 5190171 | 7/1993 | ............ H01M/4/02 |
| JP | 5234585 | 9/1993 | ............ H01M/4/02 |

OTHER PUBLICATIONS

Journal of Applied Electrochemistry, N. Kumagai et al., Jun. 18, 1991, pp. 620–627, "Cycling Behaviour of Lithium–Aluminium Alloys Formed On Various Aluminium Substrates As Negative Electrodes In Secondary Lithium Cells".

* cited by examiner

Primary Examiner—Carol Chaney
(74) Attorney, Agent, or Firm—Fitzpatrick, Cella, Harper & Scinto

(57) ABSTRACT

A highly reliable rechargeable battery comprising an anode, a separator, a cathode, an electrolyte or an electrolyte solution, and a housing, characterized in that said anode is structured to have a size which is greater than that of said cathode. The rechargeable battery provides an increased energy density and has a prolonged charging and discharging cycle life, in which a dendrite causing a reduction in the battery performance, which is generated upon operating charging in the conventional rechargeable battery, is effectively prevented from generating or from growing in the case where it should be generated.

12 Claims, 8 Drawing Sheets

F I G. 1
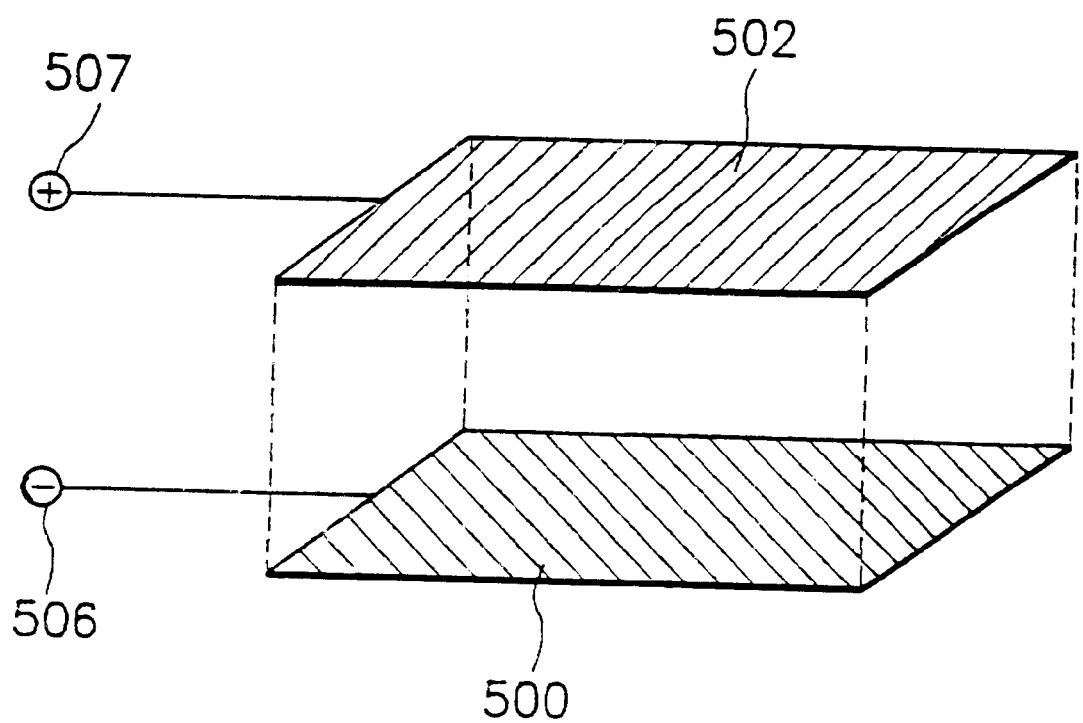

F I G. 3(a)
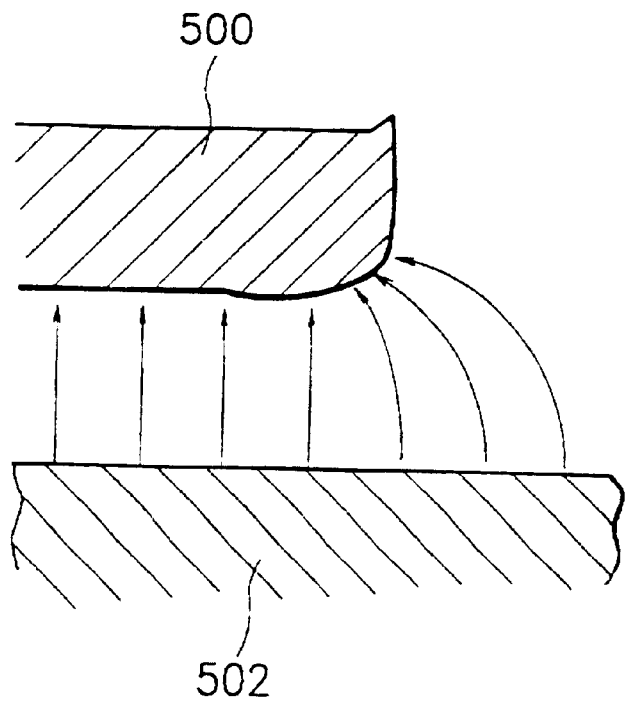
F I G. 3(b)
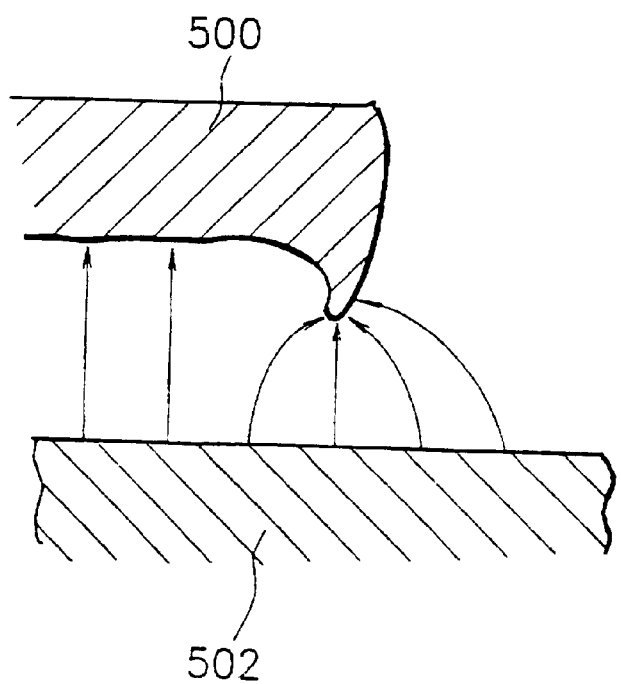

RECHARGEABLE BATTERIES

BACKGROUND OF THE INVENTION

1. Field of the Invention

The present invention relates to an improvement in the rechargeable batteries in which chemical reaction with lithium is utilized (these rechargeable batteries will be hereinafter collectively referred to as rechargeable lithium battery) and also in the rechargeable zinc series batteries. More particularly, the present invention relates to improved rechargeable lithium batteries and improved rechargeable zinc series batteries which effectively prevent a dendrite (or a branched tree-like protrusion) of lithium or zinc from growing upon repetition of charging and discharging, always exhibit an excellent current collecting performance over a long period of time, and has a prolonged cycle life (that is, a prolonged charging and discharging cycle life).

2. Related Background Art

In recent years, heating of the earth because of the so-called greenhouse effect due to an increase of atmospheric $CO_2$ has been predicted.

In the case of the steam-power generation, the amount of a fossil fuel represented by coal or petroleum to be consumed for power generation in order to comply with a societal demand for increased power supply has been continuously increased and along with this, the amount of exhaust fumes from the steam-power generation plants has been continuously increased accordingly to raise the content of gases to cause a greenhouse effect such as carbon dioxide gas in the air. This results in providing an earth-warming phenomenon. In order to prevent said earth-warming phenomenon from further developing, there is a tendency of prohibiting to newly establish a steam-power generation plant in some countries.

Under this circumstance, there have been made a proposal of conducting so-called load leveling in order to effectively utilize the power generator, wherein rechargeable batteries are installed at general houses and a surplus power unused in the night, that is, a so-called dump power, is stored in said rechargeable batteries and the power thus stored is supplied in the daytime when the power demand is increased, whereby the power generator is leveled in terms of the load therefor.

By the way, there is an increased societal demand for developing a lightweight rechargeable battery with a high energy density for an electric vehicle which does not exhaust any air polluting substance such as $CO_x$, $NO_x$, $SO_x$, hydrocarbon, and the like. Other than this demand, there are another increased societal demand for developing a miniature, lightweight, high performance rechargeable battery usable as a power source for potable instruments such as small personal computers, word processors, video cameras, and pocket telephones.

As such rechargeable battery, there has been proposed a rocking chair type lithium ion cell in which a lithium intercalation compound is used as an anode active material and carbon is used as a cathode active material. However, as of the present time, there has not realized a practically usable lithium ion battery having a sufficiently high energy density, which is considered could be attained by using a metallic lithium as the anode active material.

The public attention has now focused on the rechargeable lithium battery in which metallic lithium is used as an anode, but as of the present time, there has not yet attained a practically usable, high capacity rechargeable lithium battery with an improved energy density. Particularly, as for the known rechargeable lithium battery, there is a problem in that lithium is often deposited in a dendritic state (that is, in the form of a dendrite) on the negative electrode during charging operation, wherein such deposition of lithium in a dendritic state results in causing internal shorts or self-discharge. As one of the reasons why such practically usable, high capacity rechargeable lithium battery as above described has not yet realized, there is a fact that a manner capable of preventing the occurrence of the above dendritic lithium deposition has not developed.

Now, as above described, when the above lithium dendrite should be once formed, the dendrite is liable to gradually grow upon charging, resulting in causing internal shorts between the anode and the cathode. When the anode is internally shorted with the cathode as above described, the energy possessed by the battery is shortly consumed at the internally shorted portion to entail problems such that the battery is heated or the solvent of the electrolyte is decomposed by virtue of heat to generate gas, resulting in raising the inner pressure of the battery. These problems result in damaging the rechargeable battery or/and shortening the lifetime of the battery.

There has been proposed a manner of using a lithium alloy such as lithium-aluminum alloy as the anode for a rechargeable lithium battery in order to suppress the reactivity of the lithium so that a lithium dendrite is hardly generated. This manner is effective in preventing the generation of the lithium dendrite but is not effective in attaining a rechargeable lithium battery having a high energy density and which is long enough in cycle life.

Particularly, Japanese Unexamined Patent Publication No. 13264/1988 (hereinafter referred to as document 1), No. 47381/1993 (hereinafter referred to as document 2) or No. 190171/1993 (hereinafter referred to as document 3) discloses a non-aqueous series rechargeable battery in which the anode is constituted by a lithium alloy.

Additionally, Japanese Unexamined Patent Publication No. 114057/1988 (hereinafter referred to as document 4) discloses a non-aqueous series rechargeable battery in which the anode is constituted by a basic constituent comprising a sintered body of a mixture composed of fibrous aluminum and fibrous metal incapable of being alloyed with lithium and a negative material comprising a lithium-aluminum alloy.

Further, Japanese Unexamined Patent Publication No. 234585/1993 (hereinafter referred to as document 5) discloses a non-aqueous series rechargeable battery in which the anode is constituted by a member made of lithium metal, having powdery metal (which hardly forms an intermetallic compound with said lithium metal) uniformly deposited on the surface thereof.

Further in addition, *Journal of Applied Electrochemistry*, 22, 620-627 (1992) (hereinafter referred to as document 6) discloses a rechargeable lithium battery in which the anode is constituted by an aluminum foil having a surface applied with etching treatment.

However, any of the rechargeable batteries disclosed in the documents 1 to 6 is still problematic in that when the charging and discharging cycle is repeated at a practical level, the growth of a dendrite is often occurred to deteriorate the battery performance.

In order to eliminate this problem, there can be considered a manner wherein the anode and cathode are arranged such that they are closely opposed to each other through the separator. However, this manner is not effective in solving the problem because there is a tendency for the charging and discharging cycle life to be remarkably shortened to such an extent that is shorter than that in the case where the anode comprised of carbon is used.

Such problem occurred in the foregoing rechargeable batteries is liable to occur also in the conventional rechargeable nickel-zinc batteries, rechargeable zinc-oxygen (or zinc-air) batteries and rechargeable bromine-zinc batteries, in that in any of these batteries, when the anode and cathode are arranged such that they are closely opposed to each other through the separator, the charging and discharging cycle life is liable to remarkably shorten.

Accordingly, there is an increased demand for provision of an improved, highly reliable secondary cell which is high in energy density (or charge energy density) and long enough in charging and discharging cycle life.

SUMMARY OF THE INVENTION

A principal object of the present invention is to eliminate the foregoing problems found in the known rechargeable batteries and to provide an improved rechargeable which is free of such problems.

Another object of the present invention is to provide a highly reliable rechargeable which is high in energy density and long enough in cycle life (that is, charging and discharging cycle).

A further object of the present invention is to provide a rechargeable battery having an improved anode structured which is free of growth of a dendrite even when the charging and discharging are alternately repeated over a long period of time, and it makes the rechargeable battery to stably exhibit an excellent current collecting performance without being deteriorated.

A further object of the present invention is to provide a highly reliable rechargeable battery having a simple structure which can be easily handled and which can be efficiently produced by the conventional technique.

A further object of the present invention is to provide a highly reliable rechargeable battery which can be mass-produced without a variation in terms of the battery performance.

A further object of the present invention is to provide a highly reliable rechargeable battery comprising an anode (or a negative electrode), a separator, a cathode (or a positive electrode), an electrolyte or an electrolyte solution, and a housing, characterized in that said anode is structured to have a size which is larger than that of said cathode, said rechargeable battery being high in energy density and having a prolonged cycle life.

A further object of the present invention is to provide a rechargeable battery comprising an anode, a separator, a cathode, an electrolyte or an electrolyte solution, and a housing, characterized in that said anode or/and said cathode have an edge portion covered by an insulating material or semiconductor material, said rechargeable battery being high in energy density and having a prolonged cycle life.

The term "rechargeable battery" in the present invention includes a rechargeable lithium battery, a rechargeable nickel-zinc battery, a rechargeable zinc-oxygen battery, and a rechargeable bromine-zinc battery.

BRIEF DESCRIPTION OF THE DRAWINGS

FIG. 1 is a schematic explanatory view for illustrating a positional relationship between an anode and a cathode which are oppositely arranged in a rechargeable battery.

FIGS. 3(a) and 3(b) are schematic cross-sectional views respectively illustrating a shape of an electrically conductive edge portion of an anode and a state for lines of electric force in a rechargeable battery provided with said anode.

DESCRIPTION OF THE INVENTION AND PREFERRED EMBODIMENTS

The present invention is to eliminate the foregoing problems in found in the prior art and to attain the above described objects.

The present invention has been accomplished based on findings obtained through experimental studies by the present inventors in order to attain the above objects.

Description will be made of the experimental studies conducted by the present inventors.

The present inventors conducted extensive studies through experiments in order to find out a cause for the problems in the prior art. As a result, there was obtained a knowledge that the dendrite generated at the anode upon the charging would be of an enhanced magnitude at its edge portion where an electric field is liable to centralize.

Based on this knowledge, studies were made of a rechargeable battery in which an anode and a cathode are oppositely arranged such that the position of the former is deviated from that of the latter.

FIG. 1 is a schematic view for illustrating a positional relationship between an anode and a cathode which are oppositely arranged in a rechargeable battery. In FIG. 1, an anode 500 electrically connected to an anode terminal 506 (that is, a power outputting and inputting terminal for an anode) and a cathode 502 electrically connected to a cathode terminal 507 (that is, a power outputting and inputting terminal for a cathode) are arranged in an opposite positional relationship.

The present inventors conducted studies of a case wherein the anode 500 is deviated from the cathode 502 toward a left side direction in FIG. 1.

Figure 2:
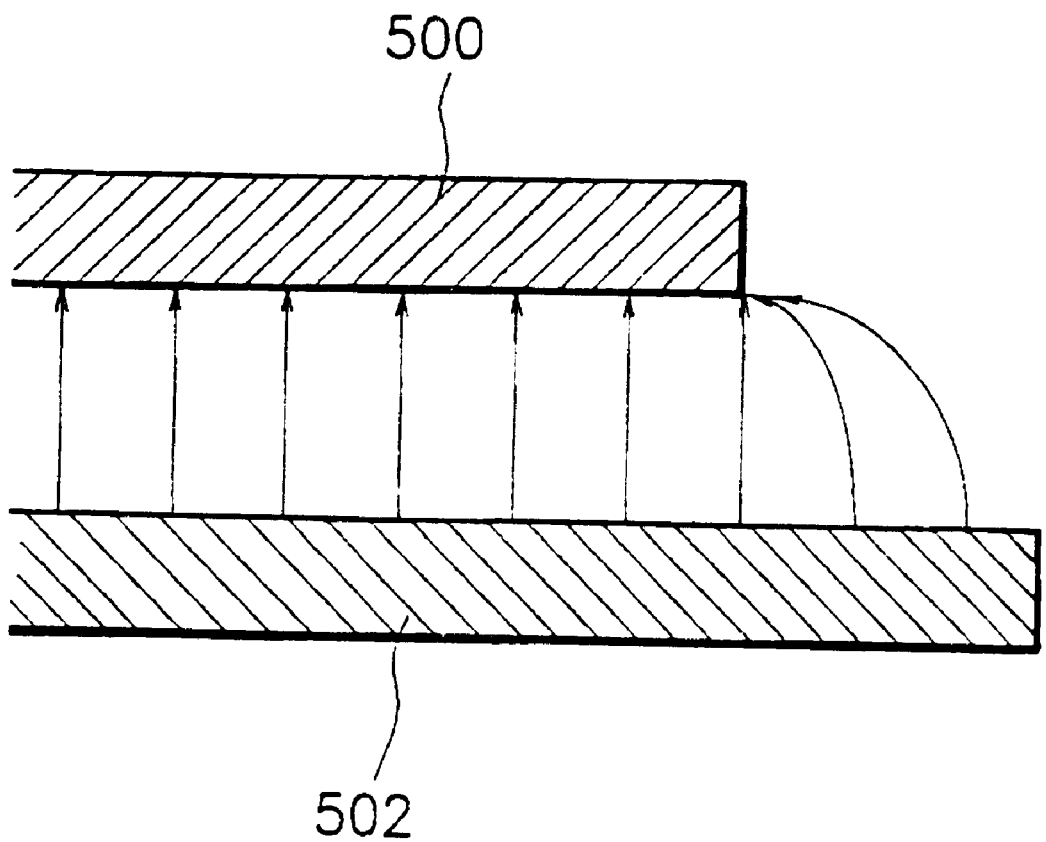
FIG. 2 is a schematic cross-sectional view for illustrating an example of a state for lines of electric force generated upon operating charging, when an edge portion of an anode is positioned inside a cathode in a rechargeable battery.

FIG. 2 shows an example of a state of the above arrangement in that an edge portion of the anode 500 is deviated from the counter cathode 502 in the left side direction, wherein a state for lines of electric force generated upon the charging is shown.

Now, when a rechargeable battery is dedicated for the charging, the anode side thereof is made to have a negative potential and the cathode side thereof is made to have a positive potential. Therefore, upon operating the charging, lines of electric force are formed such that they are directed toward the anode from the cathode. In this case, if no displacement is present in the arrangement of the cathode and anode, lines of electric force are basically formed in a uniform state.

However, in general, there is a tendency for lines of electric force to centralize at a protrusion of an electrode. Therefore, even in the above case, the lines of electric force have a tendency of centralizing at an end portion of the anode.

If a certain displacement is present in the arrangement of the cathode and anode which are oppositely arranged, the lines of electric force are not uniformly formed. Particularly, in the case shown in FIG. 2 wherein the anode is positioned to deviate inside the counter cathode, the lines of electric force are formed such that they are centralized at the anode's edge situated inside the cathode.

By the way, in general, an electrode (that is, a cathode or anode) for a rechargeable battery is formed through processing including cutting. Because of this, the electrode obtained is often accompanied with protrusions such as pointed portion or angled portion at the side ends thereof. Such protrusion will be a cause of making the lines of electric force to centralize at the protrusion when the electrode is used in a rechargeable battery. Other than this, as for an electrode used in a rechargeable battery, there is an occasion for the electrode to be bent in the fabrication of the rechargeable battery, wherein the electrode bent is liable to have a portion with a small radius of curvature.

FIGS. 3(a) and 3(b) are schematic cross-sectional views respectively illustrating a shape of an electrically conductive edge portion of an anode and a state for lines of electric force in a rechargeable battery provided with said anode.

Now, as apparent from FIG. 3(a), even in the case where an edge portion of the anode 500 situated inside the cathode 502 is not accompanied by any protrusion, lines of electric force formed are liable to centralized at said edge portion. In the case of FIG. 3(b), the anode 500 has an edge portion projected toward the counter cathode 502. In this case, lines of electric force formed are unavoidably centralized at said projected edge portion.

As a result of experimental studied in order to eliminate such centralization of lines of electric force, there were obtained the following findings.

That is, when the size of the anode is made to be grater than that of the cathode or the edge portion of at least the anode is covered by an insulating material or a semiconductor material, the field intensity at the edge portion of the anode and that at the edge portion of the cathode can be reduced to remarkably prevent occurrence of a dendrite (of lithium or zinc) and to prolong the charging and discharging cycle life of a rechargeable battery. In addition, in the case where a displacement is present in the arrangement of the cathode and anode, when the width and length of the anode are made to be greater than those of the cathode such that the edge portion of the anode is not situated inside of the cathode, it is possible to effectively prevent the anode from having a portion with an increased field intensity in the vicinity of the surface thereof.

Particularly in this respect, in a rechargeable battery comprising an anode, a separator, a cathode, an electrolyte or electrolyte solution, and a cell case, when the anode is designed such that its edge portion is reduced in terms of the field intensity, the rechargeable battery becomes to have a prolonged battery lifetime.

More particularly, when the anode's edge is covered by a stable insulating or semiconductor material incapable of being dissolved in the electrolyte solution and which is not or substantially not decomposed upon the charge and discharge reactions, the lines of electric force are effectively prevented from centralizing at the edge portion of the anode. By this, the rechargeable battery can be made to have a prolonged battery life and an improved battery performance.

The present inventors obtained further findings which will be described below.

In the above rechargeable battery, it is desired for the anode (which is oppositely arranged to the cathode) to have a greater size than that of the cathode such that the cathode's picture plane vertically projected on the surface of the anode is situated within the anode's plane. In this case, the field is effectively prevented from centralizing at the edge portion of the anode, and the rechargeable battery becomes to have a prolonged battery life and an improved battery performance.

Further, when the shortest distance between the nose of the anode's edge portion and that of the cathode's edge portion is made to be 5 times or more the distance between the cathode and the anode, the field is effectively prevented from centralizing at said noses.

Further in addition, it is desired for the anode to be designed to have a greater width and length than those of the cathode such that they are greater by 2 times or more over the square root of the sum for the square of a positioning error for the anode and the square of a positioning error for the cathode. In this case, there are provided advantages in that the production of a rechargeable battery can be efficiently conducted and a high performance rechargeable battery can be effectively produced.

The present invention has been accomplished based on these findings.

In the following, the rechargeable battery according to the present invention will be described with reference to the drawings.

Figure 4A:
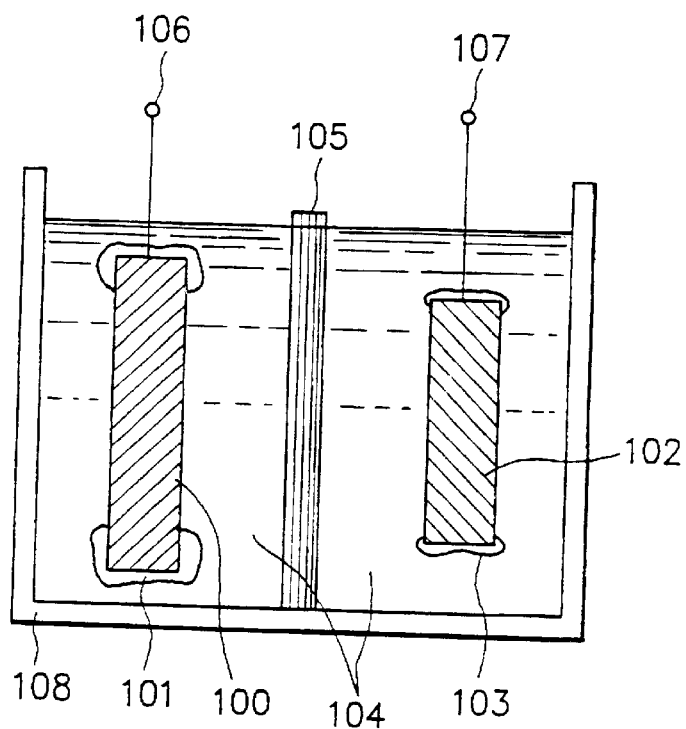
FIG. 4(a) is a schematic cross-sectional view illustrating an example of a rechargeable battery according to the present invention.
Figure 4B:
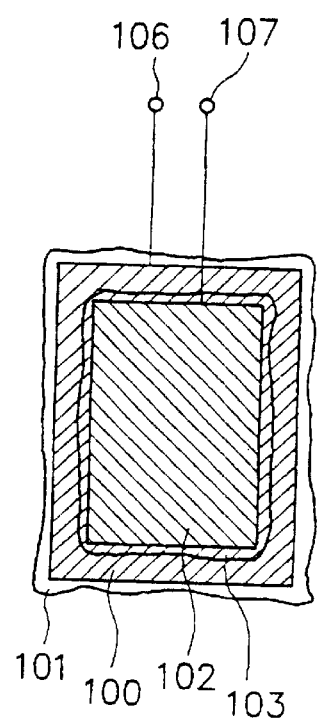
FIG. 4(b) is a schematic cross-sectional view for illustrating a dimensional relationship between the anode and cathode which are oppositely arranged and their positional relationship in the rechargeable battery shown in FIG. 4(a).

FIG. 4(a) is a schematic cross-sectional view illustrating an example of a rechargeable battery according to the present invention. FIG. 4(b) is a schematic cross-sectional view for illustrating a dimensional relationship between the cathode and anode which are oppositely arranged and their positional relationship in the rechargeable battery shown in FIG. 4(a).

In FIGS. 4(a) and 4(b), reference numeral 100 indicates an anode having an insulating or semiconductor material disposed to cover the anode's edge, reference numeral 102 a cathode having an insulating or semiconductor material disposed to cover the anode's edge, reference numeral 104 an electrolyte solution, reference numeral 105 a separator, reference numeral 106 a power outputting and inputting terminal (or an anode terminal) electrically connected to the anode 100, reference numeral 107 a power outputting and inputting terminal (or a cathode terminal) electrically connected to the cathode 102, and reference numeral 108 a battery case.

Figure 5:
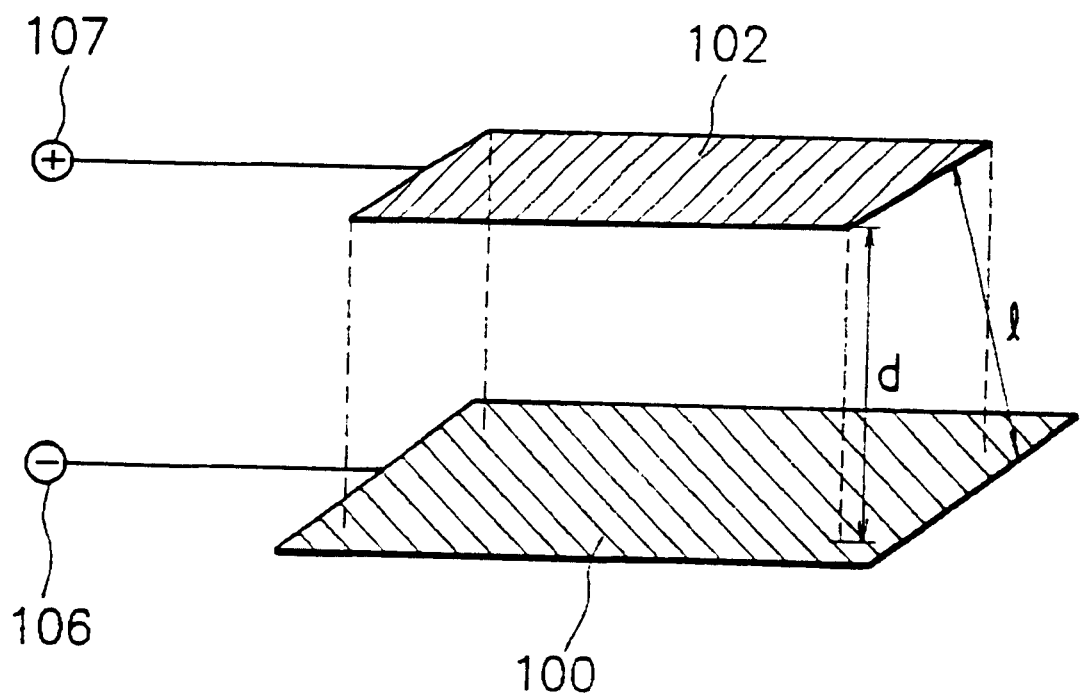
FIG. 5 is a schematic explanatory view for illustrating a positional relationship between an anode and a cathode which are oppositely arranged in a rechargeable battery according to the present invention.

FIG. 5 is a schematic explanatory view for illustrating a positional relationship between an anode 100 and a cathode 102 in a rechargeable battery, wherein the anode 100 and the cathode 102 are oppositely arranged such that the edge portion of the anode is situated outside the counter cathode in such way as shown in FIGS. 4(a) and 4(b). In FIG. 5, d indicates a distance between the cathode and the anode.

As apparent from FIGS. 4(a) and 4(b) and FIG. 5, in the present invention, the interrelation between the anode and the cathode is designed such that the size of the former greater than that of the latter. Particularly, in order to reduce the field intensity at the edge portion of the anode, of the anode and cathode which are arranged to oppose to each other, the anode is designed to have a greater area than that of the cathode such that the cathode's picture plane vertically projected onto the surface of the anode is situated within the anode's plane.

Now, as previously described, any of the conventional rechargeable lithium battery, rechargeable nickel-zinc battery, rechargeable zinc-oxygen battery, and rechargeable bromine-zinc battery has such problems as will be described in the following. That is, in their fabrication process, protrusions such as pointed portion or angled portion are liable to occur at the edge portion of not only the anode but also the cathode; and the electrode active material of not only the anode but also the cathode is often released to expose their collector. In addition, the cathode is often deviated to position outside the anode, wherein the field intensity at the edge portion of the anode is heightened to cause an increase in the current density, resulting in generating a dendrite of lithium or zinc and growing said dendrite upon the charging, whereby the battery performance is deteriorated and the charging and discharging cycle life is shortened.

However, according to the present invention, these problems can be effectively eliminated. That is, in the rechargeable battery of the present invention, the anode is designed to have a substantial area which is greater than that of the cathode, and at least the edge portion of the anode is covered by a stable insulating or semiconductor material incapable of being dissolved in the electrolyte solution and which is not or substantially not decomposed upon the charge and discharge reactions. By this, the electric field intensity at the edge portion of the anode is reduced to prevent a dendrite of lithium or zinc from generating upon the charging, wherein if said dendrite should be generated, said dendrite is prevented from growing. Particularly, this situation is that the substantial area of the anode is made to be greater than the substantial area of the cathode such that the cathode's picture plane vertically projected onto the surface of the anode is situated within the anode's plane.

The substantial area of each of the cathode and anode means an area of a cover coat composed of said insulating or semiconductor material.

In the case where the electrode (that is, the cathode or the anode) does not have have said cover coat, the area of an electrode constituting the cathode or the anode corresponds said substantial area. This means that the area of the electrode which substantially functions as the cathode or the anode corresponds the substantial area of the cathode or the anode.

Figure 6:
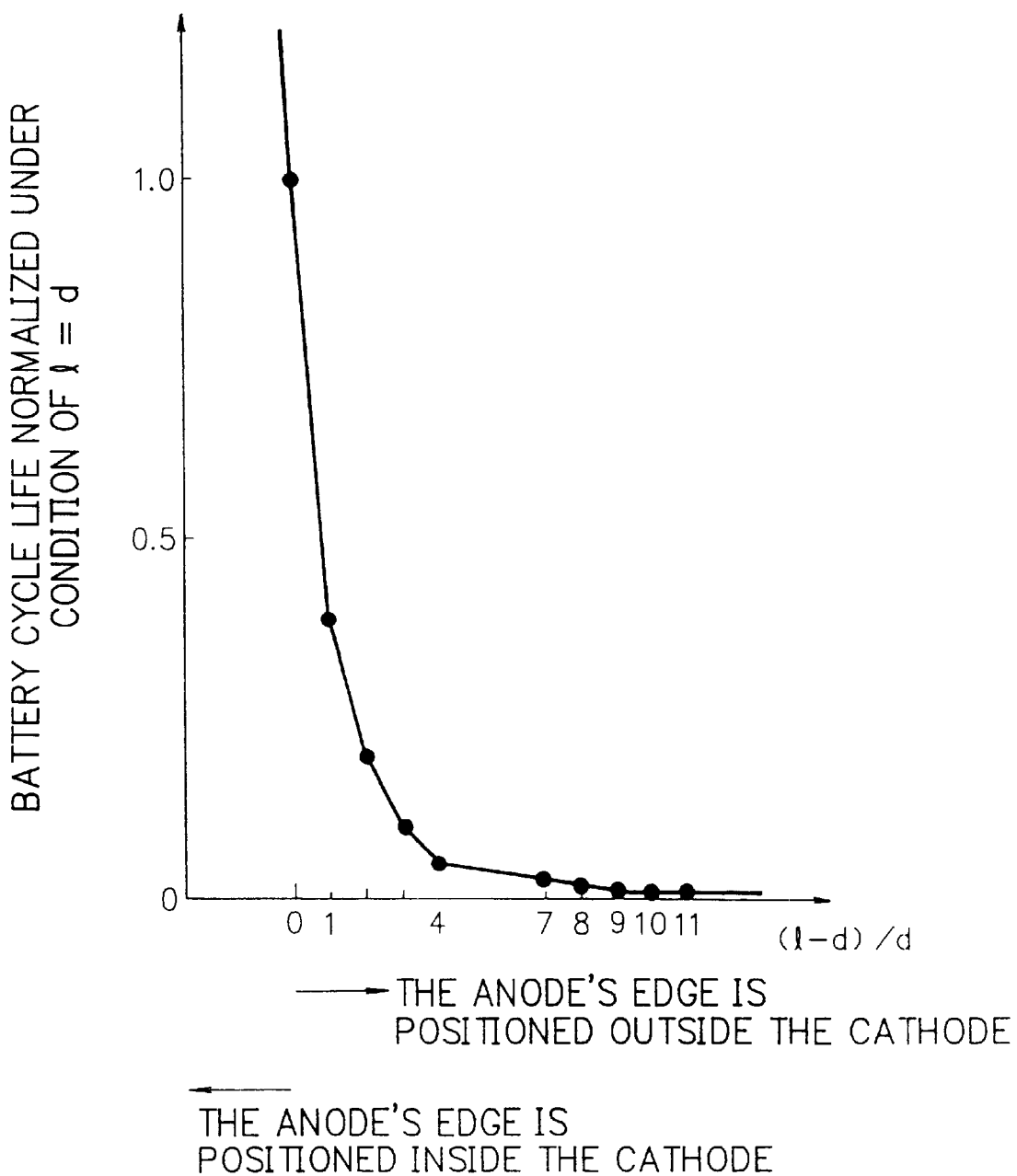
FIG. 6 is a graph showing experimental results of a tendency for the lifetime of a rechargeable battery to change when the difference between the cathode-anode distance and the cathode's edge-anode's edge distance is varied.

FIG. 6 is a graph showing experimental results of a tendency for the lifetime of a rechargeable battery to change when the difference between the anode-cathode distance and the anode's edge-cathode's edge distance is varied.

Particularly, the graph shown in FIG. 6 is a lifetime curve for rechargeable batteries, which was obtained by the present inventors through experiments, wherein d indicates a distance between the anode and cathode, l indicates a distance between the anode's edge and the cathode's edge, and (l–d)/d indicates a ratio of a distance (l–d), which is longer than the distance d, to the distance d.

The lifetime curve illustrates situations for the time t when the rechargeable battery involved reaches a prescribed lifetime in relation to the ratio ((l–d)/d) of the distance (l–d) to the distance d.

In the lifetime curve shown in FIG. 6, the lifetime t when the anode's edge is harmonized with the cathode's edge (that is, l=d, and therefore, (l–d)/d=0) is set at 1.0, and inverse numbers of the times t obtained when the distance l is varied to be $3d$, $4d$, $5d$, $8d$, $9d$, $10d$, $11d$, and $12d$ are plotted.

Based on the lifetime curve shown in FIG. 6, there was obtained the following finding. That is, in order to make a rechargeable battery to have a prolonged battery lifetime, it is desired for the anode and the cathode to be arranged such that the shortest distance between the anode's edge and the cathode's edge is preferably 5 times or more the distance d between the anode and the cathode (that is, (l–d)/d is 4 or more) or it is more preferably 10 times or more (that is, (l–d)/d is 9 or more).

Now, as for the electrode arrangement in a rechargeable battery wherein an anode and a cathode are arranged to oppose to each other, it somewhat differs at a certain extent in each rechargeable battery produced. This is unavoidably occurred because of a positioning error in the fabrication process. However, because of such positioning error in the fabrication process, problems will be sometimes entailed in that a defective rechargeable battery is produced or the resulting rechargeable batteries are varied in terms of their charging and discharging cycle life. In the case of mass-producing a rechargeable battery, the arrangement of the cathode and anode should be carefully conducted so that these problems are not occurred.

In the present invention, occurrence of such problems can be prevented by the following manner. That is, for instance, the anode is designed to have a greater width and length than those of the cathode such that said width and length are greater by 2 times or more over the square root of the sum for the square of a positioning error for the anode and the square of a positioning error for the cathode. According to this manner, if a positioning error should be occurred for the arrangement of the cathode and anode in the fabrication process of a rechargeable battery, the anode's edge is prevented from being positioned inside the cathode. By this, it is possible to mass-produce high quality rechargeable batteries which are not varied in terms of the battery performance.

In the following, description will be made of the rechargeable battery according to the present invention and the fabrication thereof.

The rechargeable battery according to the present invention includes a rechargeable lithium battery, a rechargeable nickel-zinc battery, a rechargeable zinc-oxygen battery, and a rechargeable bromine-zinc battery.

(In the following, the rechargeable nickel-zinc battery, rechargeable zinc-oxygen battery, and rechargeable bromine-zinc battery will be occasionally collectively referred to as rechargeable zinc series battery.)

In any case, a due care should be made about the constituents of the rechargeable battery so that they do not contain foreign matters. For instance, in the case of the rechargeable lithium battery, if its constituents contain water as a foreign matter, said water results in chemically reacting with the lithium in the rechargeable lithium battery, wherein the battery performance is sometimes remarkably reduced.

Anode

The anode disposed in a rechargeable battery according to the present invention basically comprises an anode active material dedicated for the battery reaction and a anode collector serving to effectively transmit an electron upon the charging and discharging. The anode active material may be designed such that it functions also as the collector.

In the case where the anode active material is a powdery material which is difficult to be formed into an anode as it is, it is possible to employ a manner of fixing such powdery anode active material to the surface of a anode collector member using a binding agent to thereby form an anode.

Specific examples of the anode active material usable in a rechargeable lithium battery are Li, alloys of Li, Al and carbon materials.

As the anode active material usable in a rechargeable zinc series battery, there can be mentioned Zn, alloys of Zn, zinc oxide, and zinc hydroxide.

The anode collector may be constituted by an appropriate metal or an appropriate metal alloy.

Specific examples of such metal are Ni, Ti, Cu, Al, Pt, Pd, Au, and Zn. Specific examples of such metal alloy are alloys of these metals such as stainless steel.

The cathode collector may be shaped in a plate-like form, foil-like form, mesh form, porous form-like sponge, punching metal form, or expanded metal form.

Cathoode

The cathode generally comprises a cathode collector, a cathode active material, an electrically conductive auxiliary, and a binding agent.

Particularly, the cathode is usually formed by disposing a mixture of a cathode active material, an electrically conductive auxiliary and a binding agent on a member capable of serving as a cathode collector.

The electrically conductive auxiliary can include powdery or fibrous aluminum, copper, nickel, stainless steel and graphite and other than these, carbon blacks such as KETJEN BLACK and acetylene black.

The binding agent is desired to be stable for an electrolyte solution used as the electrolyte in a rechargeable battery.

Specific examples of such binding agent in the case where a nonaqueous series electrolyte solution is used are fluorine-containing resins and polyolefines such as polytetrafluoroethylene, polyvinylidene fluoride, polyethylene, polypropylene, ethylene-propylene copolymer, and ethylene-propylene-diene-terpolymer.

Specific examples of the binding agent in the case where an aqueous series electrolyte solution is used are polivinyl alcohols, celluloses, and polyamides.

The cathode collector serves to supply an electric current so that it can be efficiently consumed for the electrode reaction upon conducting the charging and discharging or to collect an electric current generated. The cathode collector is therefore desired to be constituted by a material which has a high electrical conductivity and is inactive to the battery reaction.

The material by which the cathode collector is constituted can include Ni, Ti, Cu, Al, Pt, V, Au, Zn, and alloys of two or more of these metals such as stainless steel.

The cathode collector may be shaped in a plate-like form, foil-like form, mesh form, porous form-like sponge, punching metal form, or expanded metal form.

Herein, as for the cathode used in the rechargeable zinc-oxygen battery, it comprises a cathode collector, a catalyst, and a water repellant.

Description will be made of the cathode active material usable in the present invention.

The cathode active material is different depending upon the kind of a rechargeable battery. The cathode active material in the case of a rechargeable lithium battery:

As the cathode active material in the case of a rechargeable lithium battery, there is usually used a compound selected from transition metal oxides and transition metal sulfides. The metals of these transition metal oxides and transition metal sulfides can include metals partially having a d-shell or f-shell. Specific examples of such metal are Sc, Y, lanthanoids, actinoids, Ti, Zr, Hf, V, Nb, Ta, Cr, Mo, W, Mn, Tc, Re, Fe, Ru, Os, Co, Rh, Ir, Ni, Pd, Pt, Cu, Ag and Au. Of these, Ti, V, Cr, Mn, Fe, Co, Ni and Cu are most appropriate.

The cathode active material is desired to be comprised of any of the above transition metal oxides and transition metal sulfides, which is incorporated with lithium. The lithium-containing cathode active material may be formed by a manner of obtaining a transition metal oxide or transition metal sulfide using lithium hydroxide or lithium salt. Alternatively, it may be formed by a manner of providing a mixture of a given transition metal oxide or transition metal sulfide, and lithium hydroxide, lithium nitrate, or lithium carbonate capable of being readily thermally decomposed, and subjecting said mixture to heat treatment.

The Cathode Active Material in the Case of a Rechargeable Zinc Series Battery

As the cathode active material in the case of a rechargeable nickel-zinc battery, there is usually used nickel oxide or nickel hydroxide.

As the cathode active material in the case of a rechargeable zinc-oxygen battery which comprises a cathode collector, a catalyst, and a water repellant, there is used oxygen. This oxygen is usually supplied from the air. As the catalyst usable in this case, there is usually used porous carbon material, porous nickel material, or copper oxide. As the water repellant usable, there can be mentioned fluorine-containing resins such as porous tetrafluoroethylene resin.

As the cathode active material in the case of a rechargeable bromine-zinc battery, there is used bromine.

Separator

The separator is disposed between the anode and the canthode, and it serves to prevent the anode and the cathode from suffering from internal-shorts. In addition, the separator also serves to retain the electrolyte solution.

The separator is required to have a porous structure capable of allowing lithium ion or zinc ion to pass therethrough and it is also required to be insoluble into and stable to the electrolyte solution.

The separator is usually constituted by a nonwoven fabric or a memberane having a micropore structure made of glass, polypropylene, polyethylene, fluorine-containing resin, or polyamide. Alternatively, the separator may be constituted by a metal oxide film or a resin film combined with a metal oxide respectively having a plurality of pores. In a preferred embodiment, the separator is constituted by a multilayered metal oxide film. In this case, the separator effectively prevent a dendrite from passing therethrough and because of this, occurrence of internal-shorts between the anode and the cathode is desirably prevented. In another preferred embodiment, the separator is constituted by an incombustible fluorine-containing resin, glass or metal oxide film. In this case, an improvement can be attained in terms of the safety even in the case where such internal-shorts should be unexpectedly occurred.

Electrolyte

In the present invention, there can be used an appropriate electrolyte as it is, a solution of said electrolyte dissolved in a solvent, or a material of said solution having immobilized using a gelatinizing agent. However, an electrolyte solution obtained by dissolving an appropriate electrolyte in an solvent is usually used in a way that said electrolyte solution is retained on the separator.

The higher the electrical conductivity of the electrolyte, the better. Particularly, it is desired to use such an electrolyte that the electrical conductivity at 25° C. is preferably $1 \times 10^{-3}$ S/cm or more or more preferably, $5 \times 10^{-3}$ S/cm or more.

The electrolyte used is different depending upon the kind of a rechargeable battery. The electrolyte usable in the case of a rechargeable lithium battery:

The electrolyte usable in this case can include inorganic acids such as $H_2SO_4$, HCl and $HNO_3$; salts of $Li^+$ (lithium ion) with Lewis acid ion such as $BF_4^-$, $PF_6^-$, $ClO_4^-$, $CF_3SO_3^-$, or $BPh_4^-$ (with Ph being a phenyl group); and mixtures of two or more of said salts.

Other than these supporting electrolytes, salts of the above described Lewis acids ions with cations such as sodium ion, potassium ion, tetraalkylammonium ion, or the like are also usable.

In any case, it is desired that the above salts are used after they are subjected to dehydration or deoxygenation, for example, by way of heat treatment at a reduced pressure.

The solvent in which the electrolyte is dissolved can include acetonitrile, benzonitrile, propylene carbonate, ethylene carbonate, dimethyl carbonate, diethyl carbonate, demethylformamide, tetrahydrofuran, nitrobenzene, dichloroethane, diethoxyethane, 1,2-dimethoxyethane, chlorobenzene, γ-butyrolactone, dioxolan, sulfolan, nitrometane, dimethyl sulfide, dimethyl oxide, methyl formate, 3-methyl-2-oxdazolydinone, 2-methyltetrahydrofuran, 3-propylsydonone, sulfur dioxide, phosphoryl chloride, thionyl chloride, sulfuly chloride, and mixtures of two or more of these.

As for these solvents, it is desired for them to be subjected to dehydration using activated alumina, molecular sieve, phosphorous pentaoxide, or calcium chloride, prior to their use. Alternatively, it is possible for them to be subjected to distillation in an atmosphere composed of inert gas in the presence of an alkali metal, wherein moisture and foreign matters are removed.

In order to prevent leakage of the electrolyte, it is desired for the electrolyte to be gelatinized using an appropriate gelatinizing agent.

The gelatinizing agent usable in this case can include polymers having a property such that it absorbs the solvent of the electrolyte solution to swell. Specific examples of such polymer are polyethylene oxide, polyvinyl alcohol, and polyacrylamide.

The electrolyte usable in the case of a rechargeable zinc series battery:

The electrolyte usable in this case can alkalis such as potassium hydroxide, sodium hydroxide, lithium hydroxide, and the like; and inorganic salts such as zinc bromide and the like.

In order to prevent leakage of the electrolyte, it is desired for the electrolyte to be gelatinized using an appropriate gelatinizing agent.

The gelatinizing agent usable in this case can include polymers having a property such that it absorbs the solvent of the electrolytic solution to swell. Specific examples of such polymer are polyethylene oxide, polyvinyl alcohol, and polyacrylamide. Other than these, starch is also usable.

Coating for Electrode'S Edge

In the present invention, it is desired for at least the anode's edge (or the anode's edge portion) to be covered by a coat comprising an insulating or semiconductor material. It is possible to also cover the cathode's edge as well as the anode's edge. By disposing said coat to at least the anode's edge, the field intensity at the anode's edge is reduced to remarkably prevent occurrence of a dendrite (of lithium or zinc) and to prolong the battery life. This situation is further improved in the case where the cathode's edge is also provided with said coat.

Description will be made of the coating for the anode's edge.

To provide the anode's edge with a coat comprising an insulating material or a semiconductor material can be conducted by (a) a coating process wherein a liquid or a powdery material capable of providing an insulating film or a semiconductor film is applied by means of a coating means, (b) a deposition process wherein a liquid or a raw material gas capable of providing an insulating film or a semiconductor film is decomposed to cause the deposition of a film, or (c) other deposition process wherein a solid material capable of providing an insulating film or a semiconductor film is evaporated to cause the formation of a film.

In any case, in order to provide only a desired portion of the anode's edge with the above described coat, the coat formation is desired to be conducted while using an appropriate masking means. Particularly, a portion of the anode's edge which is intended to have no coat is previously masked by the masking means, the coat formation is then conducted, and after the coat formation, the masking means is detached. By this, the coat formation can be conducted for only a desired portion of the anode's edge. It is a matter of course that this selective coat formation can be conducted without using such masking means.

The foregoing coating process (a) can include screen printing process, roll coating process, dip coating process, spray coating process, electrostatic coating process, and electrocoating process.

The foregoing deposition process (b) can include thermal-induced CVD process, and plasma CVD process.

The foregoing deposition process (c) can include sputtering process, electron beam evaporation process, cluster ion beam evaporation process.

Description will be made of the insulating film and the semiconductor film.

Either the insulating film or the semiconductor film may be comprised of an appropriate material selected from the group consisting of stable organic high-molecular materials, metal oxide materials, and organic-inorganic composite materials comprising one or more of said high-molecular materials and one or more of said metal oxide materials, which are not dissolved in the electrolyte solution and are not decomposed upon the charge and discharge reactions.

Specifically, in the case of a rechargeable lithium battery in which a nonaqueous electrolyte solution (that is, a solvent-containing electrolyte solution) is used as the electrolyte, the organic high-molecular material can include polyolefins such as polyethylene, polypropylene, and the like, fluorine-containing resins, and silicone resins. Other than these, highly crosslinked polymers are also usable. Of these, fluorine-containing resins having an ether linkage are the most appropriate because they excel in stability and can be readily applied upon the coating.

As for the high-molecular materials which are not crosslinked, it is desired for them to be crosslinked using an appropriate crosslinking agent. Specific examples of such crosslinking agent are diisocyanates, polyisocyanate prepolymers, block isocyanates, organic peroxides, polyamines, oximes, nitroso compounds, sulfur, sulfur compounds, selenium, magnesium oxide, lead oxide, and zinc oxide. Alternatively, they can be crosslinked by a manner of subjecting to irradiating of radiant-ray, electron beam, or ultraviolet ray.

In the case of a rechargeable zinc series battery in which an aqueous electrolyte solution is used as the electrolyte, there can be also used those not crosslinked of the above described water-insoluble high-molecular materials.

The foregoing metal oxide material can include silica, titanium oxide, alumina, zirconium oxide, magnesium oxide, tantalum oxide, molybdenum oxide, tungsten oxide, tin oxide, indium oxide, iron oxide, chromium oxide, aluminum phosphate, iron phosphate, silicon phosphate, and mixtures of these.

It is possible that one or more of these metal oxide materials are mixed with one or more of the above described high-molecular materials so as to form an organic-inorganic composite. The organic-inorganic composite material excels particularly in mechanical strength.

The coat formation using such metal oxide may be conducted by way of a sol-gel transformation process. In this case, the coat formation is facilitated.

In any case, prior to forming the foregoing coat (comprising an insulating or semiconductor material) therefor, it is possible to subject the anode's edge to surface treatment by way of a manner of subjecting the anode's edge to irradiation of ultraviolet rays, a manner of subjecting the anode's edge to ozone oxidation, or a manner of treating the anode's edge with the use of an organometallic compound such as a silane coupling agent or titanium coupling agent. In this case, the adhesion of the coat with the anode's edge is improved so that the coat is hardly removed from the anode's edge.

The above description is directed only for the coat formation to the anode's edge, but the cathode's edge can be also coated by an insulating film or a semiconductor film in the same manner as that for the anode's edge.

Shape and Structure of Secondary Lithium Cell

There is no particular limitation for the shape of the rechargeable battery according to the present invention.

The rechargeable battery according to the present invention may be in the form of a flat round shape (or a coin-like shape), a cylindrical shape, a rectangular prismatic shape, or a sheet-like shape. In the case where the rechargeable battery is shaped in a spiral-wound cylindrical form, the anode, separator and cathode are arranged in the named order and they are spriral-wound and because of this, there are provided advantages such that the battery area can be increased as desired and a high electric current can be flown upon operating the charging and discharging. In the case where the rechargeable battery is shaped in a rectangular prismatic form, there is provided an advantage in that the space of a device for housing the rechargeable battery can be effectively utilized.

As for the structure of the rechargeable battery according to the present invention, it can optionally made to be of a single layer structure or a stacked structure.

Figure 7:
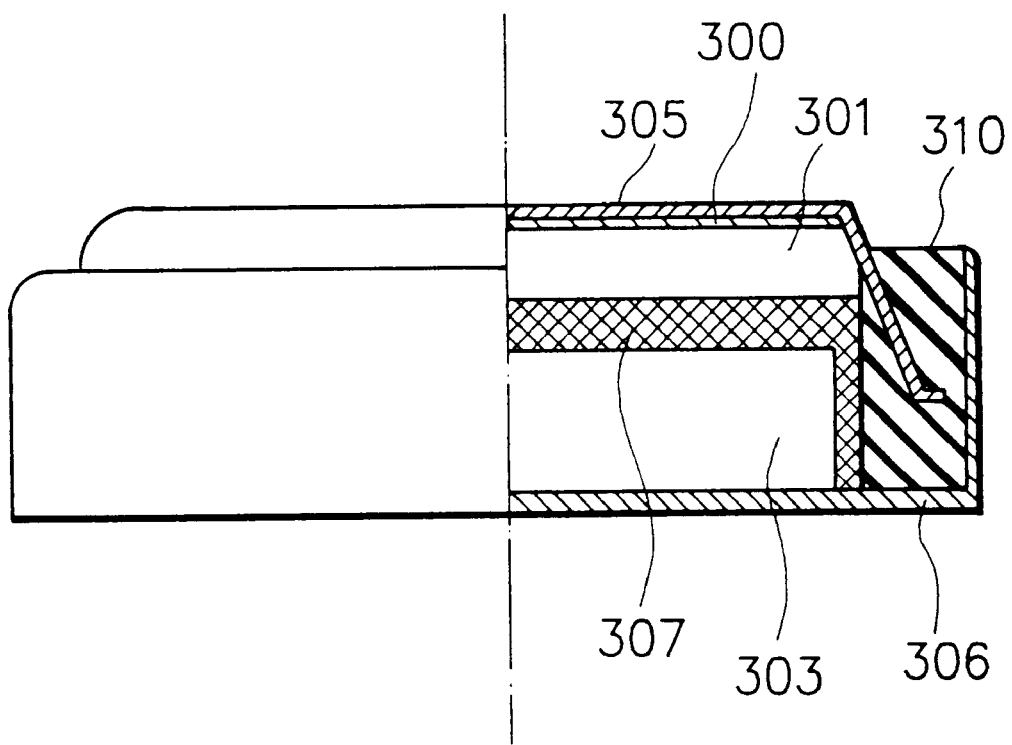
FIG. 7 is a schematic cross-sectional view illustrating a single-layer system flat rechargeable battery.
Figure 8:
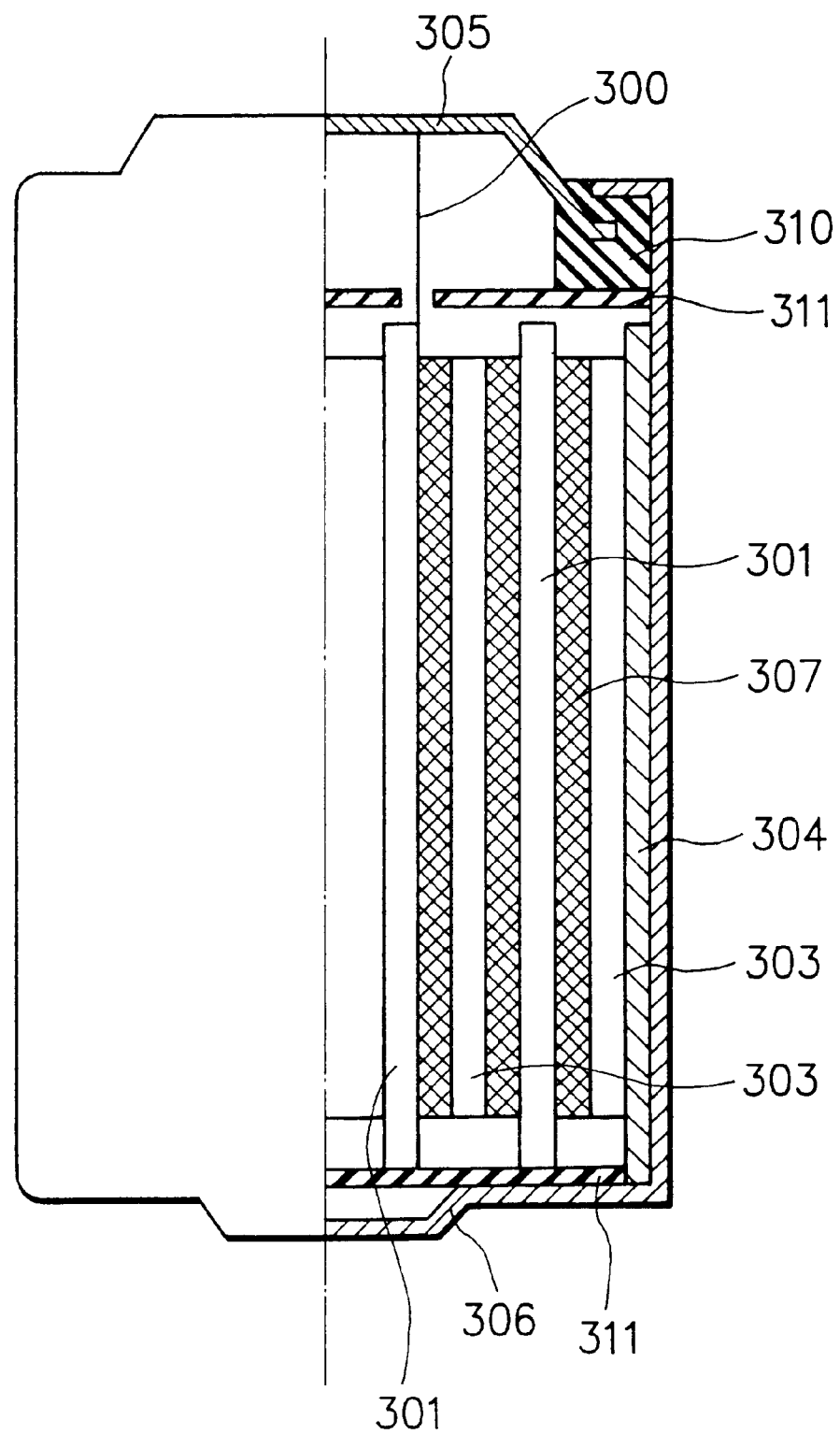
FIG. 8 is a schematic cross-sectional view illustrating a spiral-wound cylindrical rechargeable battery.

FIG. 7 is a schematic cross-sectional view illustrating an example of a single-layer structure type flat rechargeable battery according to the present invention. FIG. 8 is a schematic cross-sectional view illustrating an example of a spiral-wound cylindrical rechargeable battery according to the present invention.

In FIGS. 7 and 8, reference numeral 300 indicates an anode collector, reference numeral 301 an anode applied with a coat composed of an insulating or semiconductor material at the edge thereof (this coat is not shown), reference numeral 303 a cathode, reference numeral 305 an anode terminal (or an anode cap), reference numeral 306 a cathode can, reference numeral 307 a separator and an electrolyte (or an electrolyte solution), reference numeral 310 an insulating packing, and reference numeral 311 an insulating plate.

In the above, the cathode 303 may be also applied with a coat composed of an insulating or semiconductor material at the edge thereof (this coat is not shown).

The fabrication of a rechargeable battery of the configuration shown in FIG. 7 or FIG. 8 is conducted, for example, in the following manner. That is, a combination comprising the separator 307 interposed between the anode 301 and the cathode 303 is positioned in the cathode can 306. Thereafter, the electrolyte is introduced thereinto. The resultant is assembled with the anode cap 305 and the insulating packing 310, followed by subjecting to caulking treatment. Thus, there is obtained the rechargeable battery.

The preparation of the constituent materials for the rechargeable lithium battery and the fabrication of said rechargeable battery are desired to be conducted in a dry air atmosphere free of moisture or a dry inert gas atmosphere free of moisture.

As the constituent of the insulating packing 310, there can be used fluorine-containing resin, polyamide resin, polysulfone resin, or various rubbers. The sealing is typically conducted using a gasket such as the insulating packing, as shown in FIGS. 7 and 8. Other than this, it can be conducted by means of glass sealing, adhesive sealing, welding or soldering.

As the constituent of the insulating plate 311 shown in FIG. 8, there can be used organic resins and ceramics.

Any of the cathode can 306 and the anode cap 305 can be constituted by stainless steel, titanium clad steel, copper clad steel, or nickel-plated steel.

In any of the configurations shown in FIGS. 7 and 8, the cathode can 306 is designed to serve also as a battery casing. In the case where a battery casing is independently used, the battery casing can be constituted by a metal such as zinc, an alloy such as stainless steel, a plastic such as polypropylene, or a composite of a metal or glass fiber with plastic.

Although this is not shown in any of FIGS. 7 and 8, but it is possible to employ an appropriate safety vent in any of the configurations shown in FIGS. 7 and 8.

In the following, the present invention will be described in more detail with reference to examples, which are only for illustrative purposes but not intended to restrict the scope of the present invention to these examples.

EXAMPLE 1

There was prepared a rechargeable lithium battery of the configuration shown in FIG. 7 in the following manner.
Formation of cathode:

Electrolytic manganese dioxide and lithium carbonate were well mixed at a mixing ratio of 1:0.4, and the mixture obtained was subjected to heat treatment at 800° C. to obtain a lithium-manganese oxide material. The lithium-manganese oxide material was well mixed with powdery acetylene black in an amount of 3 wt. % and powdery polyvinylidene fluoride in an amount of 5 wt. %, followed by mixing with N-methyl-2-pyrrolidone, to thereby obtain a paste-like product.

The paste-like product thus obtained was applied onto the surface of a circular aluminum foil, followed by drying at 150° C., to thereby obtain a cathode. Then, a coating liquid obtained by dissolving a powdery fluororesin paint SUPERKONACK (trademark name, produced by Nippon Oils & Fats Co., Ltd.) in an amount of 20 wt. % in xylene was applied to the cathode's edge by means of the screen printing process, followed by drying, and thereafter, this coating procedures were repeated. The resultant was subjected to heat treatment at 170° C. and under reduced pressure to crosslink and harden the fluororesin coat formed at the cathode's edge.

Thus, there was obtained a cathode having a fluororesin coat at the edge thereof (hereinafter referred to as cathode).

Formation of Anode

There was firstly provided a circular aluminum foil having a diameter which is 2 mm greater than that of the aluminum foil used in the cathode. The aluminum foil was immersed in a 5% potassium hydroxide aqueous solution for 5 minutes, wherein the surface of the aluminum foil was etched. The aluminum foil thus treated was dehydrated using acetone and isopropyl alcohol, followed by subjecting drying under reduced pressure.

Then, a coating liquid obtained by dissolving a powdery fluororesin paint SUPERKONACK (trademark name, produced by Nippon Oils & Fats Co., Ltd.) in an amount of 20 wt. % in xylene was applied to the aluminum foil's edge by means of the screen printing process, followed by drying, and thereafter, this coating procedures were repeated. The resultant was subjected to heat treatment at 170° C. and under reduced pressure to crosslink and harden the fluororesin coat formed at the aluminum foil's edge.

Thus, there was obtained a anode having a fluororesin coat at the edge thereof (hereinafter referred to as anode).

Preparation of Electrolyte Solution

There was provided a moisture-free mixed solvent composed of ethylene carbonate (EC) and methoxy carbonate (DMC) with an equivalent mixing ratio. 1 M (mol/l) of tetrafluoro lithium borate was dissolved in the mixed solvent. Thus, there was obtained an electrolyte solution.

Separator

There was provided a 25 um thick polypropylene member provided with a number of small pores as a separator.

Fabrication of rechargeable lithium battery:

The fabrication of a rechargeable lithium battery was conducted in a dry argon atmosphere. The separator was interposed between the anode and the cathode, and the resultant was inserted into a cathode can made of titanium clad steel. Then, the electrolyte solution was injected into the cathode can. The resultant was sealed using an anode cap made of titanium clad steel and an insulating packing made of fluoro rubber. Thus, there was obtained a rechargeable lithium battery.

EXAMPLE 2

There was prepared a rechargeable lithium battery of the configuration shown in FIG. 7 in the same manner as in Example 1, except that the cathode and the anode were formed in the following manner.

Formation of Cathode

Electrolytic manganese dioxide and lithium carbonate were well mixed at a mixing ratio of 1:0.4, and the mixture obtained was subjected to heat treatment at 800° C. to obtain a lithium-manganese oxide material. The lithium-manganese oxide material was well mixed with powdery acetylene black in an amount of 3 wt. % and powdery polyvinylidene fluoride in an amount of 5 wt. %, followed by mixing with N-methyl-2-pyrrolidone, to thereby obtain a paste-like product.

The paste-like product thus obtained was applied onto the surface of a circular aluminum foil, followed by drying at 150° C., to thereby obtain a cathode.

Formation of Anode

There was firstly provided a circular aluminum foil having a diameter which is 2 mm greater than that of the aluminum foil used in the cathode. The aluminum foil was immersed in a 5% potassium hydroxide aqueous solution for 5 minutes, wherein the surface of the aluminum foil was etched. The aluminum foil thus treated was dehydrated using acetone and isopropyl alcohol, followed by subjecting drying under reduced pressure.

Then, a patterning mask was positioned on the edge of the aluminum foil such that said edge was exposed. Thereafter, a coating liquid obtained by dissolving a powdery fluororesin resin TEFLON AF (trademark name, produced by Du Pont Company) in an amount of 20 wt. % in xylene was applied to the aluminum foil's edge by means of a spray coater, followed by drying, and thereafter, the patterning mask was detached. The resultant was subjected to heat treatment at 150° C. and under reduced pressure to harden the fluororesin coat intermittently formed at the aluminum foil's edge.

Thus, there was obtained a anode having a fluororesin coat at the edge thereof.

EXAMPLE 3

There was prepared a rechargeable lithium battery of the configuration shown in FIG. 7 in the same manner as in Example 1, except that in the formation of anode, no fluororesin coat was formed at the edge of the aluminum foil having an etched surface.

EXAMPLE 4

There was prepared a rechargeable lithium battery of the configuration shown in FIG. 7 in the same manner as in Example 1, except that in the formation of cathode, no fluororesin coat was formed at the edge of the aluminum foil; and in the formation of anode, no fluororesin coat was formed at the edge of the aluminum foil having an etched surface was not conducted.

Comparative Example 1

There was prepared a rechargeable lithium battery of the configuration shown in FIG. 7 in the same manner as in Example 4, except that the size of the aluminum foil for the anode was made to be the same as that of the aluminum foil for the cathode.

EXAMPLE 5

There was prepared a rechargeable nickel-zinc battery of the configuration shown in FIG. 7 in the following manner.

Formation of Cathode

A mixture of powdery nickel hydroxide and nickel powder was well mixed with carboxymethylcellose as a binding agent, followed by mixing with pure water, to obtain a paste-like product. And a foamed nickel sheet CELLMET (trademark name, produced by Sumitomo Electric Industries, Ltd.) in a circular form was filled with the paste-like product. The resultant was dried, followed by subjecting to press treatment. Thus, there was obtained a cathode.

Formation of Anode

There was firstly provided a circular punching metal member made of copper having a diameter which is 1.3 mm greater than that of the foamed sheet used in the cathode.

A paste-like product obtained by mixing a mixture of zinc powder and powdery zinc oxide with polyvinyl alcohol and kneading the resultant with the addition of pure water was applied onto the surface of the copper punching metal member. The resultant was dried, followed by subjecting to press treatment. Thus, there was obtained a composite member. Then, a coating liquid of thermosetting epoxy resin was applied to the edge of the composite member by means of the screen printing process, followed by subjecting heat treatment at 150° C. to harden the epoxy resin coat formed at the composite member's edge. Thus, there was obtained an anode.

Electrolyte Solution

There was provided a 30 wt. % lithium hydroxide aqueous solution as an electrolyte solution.

Formation of Separator

A micro-cellular polypropylene film having been subjected to hydrophilic treatment, a nonwoven fabric made of polypropylene having been subjected to water-seasoning treatment, and another micro-cellular polypropylene film having been subjected to hydrophilic treatment were laminated in the named order to obtain a composite having a thickness of 100 um as a separator.

Fabrication of Rechargeable Nickel-zinc Battery

The separator was interposed between the anode and the cathode, and the resultant was inserted into a battery case made of titanium clad steel. Then, the electrolyte solution was injected into thereinto. The resultant was sealed using an anode cap made of titanium clad steel and an insulating packing made of fluoro rubber. Thus, there was obtained a rechargeable nickel-zinc battery.

EXAMPLE 6

There was prepared a rechargeable zinc-oxygen battery of the configuration shown in FIG. 7 in the following manner.

Formation of Cathode

A mixture of acetylene black, manganese dioxide and cobalt dioxide was well mixed with powdery polytetrafluoroethylene. The resultant mixture was well mixed with a solution obtained by dissolving a powdery fluororesin paint SUPERKONACK (trademark name, produced by Nippon Oils & Fats Co., Ltd.) in an amount of 5 wt. % in xylene to obtain a paste-like product. The paste-like product was applied onto the surface of a nickel-plated copper mesh member in a circular form, followed by drying, then subjecting to heat treatment at 170° C. under reduced pressure to harden the coating formed on the surface of the nickel-plated copper mesh member. The resultant was subjected to hot pressing treatment using a hot pressure roller to obtain a cathode.

Formation of Anode (1) There was prepared a coating composition was prepared in the following manner. That is, tetraethoxysilane, isopropyl alcohol, water and hydrochloric acid were mixed. The resultant mixture was heated at 60° C. to obtain a sol liquid. With the sol liquid thus obtained, poly(2-methyl-2-oxazoline), polyvinyl chloride, and cyclohexanone were well mixed. Thus, there was obtained a coating composition.

(2) A mixture of powder zinc oxide and zinc powder was well mixed with powdery polytetrafluoroethylene. The resultant was applied onto the surface of a copper mesh member by way of the pressure molding process to obtain a composite (that is, a zinc electrode plate). The resultant zinc electrode plate was cut to obtain a circular zinc electrode plate having a diameter which is 2.5 mm greater than that of the circular nickel-plated copper mesh member used in the formation of cathode.

Then, the coating composition obtained in the above (1) was applied to the edge of the zinc electrode plate by means of the dip coating process, followed by drying, to obtain an anode.

Electrolyte Solution

There was provided a 30 wt. % lithium hydroxide aqueous solution as an electrolyte solution.

Separator

There was provided a conventional cellophane separator for a rechargeable battery.

Fabrication of Rechargeable Zinc-oxygen Battery

The separator was interposed between the anode and the cathode, and the resultant was inserted into a cathode case made of titanium clad steel having air access holes. Then, the electrolyte solution was injected into thereinto. The resultant was sealed using an anode cap made of titanium clad steel and an insulating packing made of fluoro rubber. Thus, there was obtained a rechargeable zinc-oxygen battery.

Comparative Example 2

The procedures of Example 5 were repeated, except that the size of the copper punching metal member for the anode was made to be the same as that of the foamed nickel sheet for the cathode, and in the formation of the anode, no epoxy resin coat was formed at the edge of the composite member for the anode, to thereby obtain a rechargeable nickel-zinc battery.

Comparative Example 3

The procedures of Example 6 were repeated, except that the size of the zinc electrode plate for the anode was made to be the same as that of the nickel-plated copper mesh member for the cathode, and in the formation of the anode, no coat was formed at the edge of the zinc electrode plate for the anode, to thereby obtain a rechargeable zinc-oxygen battery.

Evaluation

As for each of the rechargeable batteries obtained in the above Examples 1 to 6 and the above Comparative Examples 1 to 3, evaluation was conducted with respect to battery characteristics through the charging and discharging cycle test.

The charging and discharging cycle test was conducted in the following manner. That is, each rechargeable battery was placed in a charging and discharging device HJ-106M (produced by Hokuto Denko Kabushiki Kaisha), wherein charging and discharging were alternately repeated under conditions of 1 C (electric current of 1 time the electric capacity per an hour based on the electric capacity calculated from the cathode active material of each rechargeable battery) for the charging and discharging, and 30 minutes for the rest. As for other conditions, in the case of the rechargeable lithium battery, the cut-off voltage upon the charging was made to be 4.5 V and the cut-off voltage upon the discharging was made to be 2.5 V. Similarly, in the case of each of the rechargeable nickel-zinc battery and the rechargeable zinc-oxygen battery, the cut-off voltage upon the charging was made to be 2.0 V and the cut-off voltage upon the discharging was made to be 0.9 V.

The charging and discharging cycle test was initiated by operating charging.

In the charging and discharging test, as for each rechargeable battery, there were observed its battery capacity (that is, an energy density, namely, a discharge energy density) per a unit volume of the rechargeable battery and its charging and discharging cycle life. The battery capacity was based on the service capacity after the third repetition of the charging and discharging cycle. And the charging and discharging cycle life was based on the number of the charging and discharging cycle having been repeated until the battery capacity became less than 60% of the initial battery capacity.

The observed results obtained are collectively shown in Table 1 in terms of the ratio of the charging and discharging cycle lives of the corresponding two rechargeable batteries.

In Table 2, there are shown the size relationship between the anode and the cathode as for each rechargeable battery and the presence or absence of the edge coat as for each rechargeable battery.

Based on the results shown in Table 1, there were obtained the following facts. That is, the rechargeable batteries obtained in Examples 1 to 6 belonging to the present invention are surpassing the rechargeable batteries obtained in Comparative Examples 1 to 3 in terms of the charging and discharging cycle life. As for the rechargeable lithium batteries obtained in Examples 1 to 4, the charging and discharging cycle life is increased in the order of Example 1, Example 2, Example 3, and Example 4.

Further, in the present invention, even in the case where zinc is used in the anode, there can be obtained a desirable rechargeable battery excelling in charging and discharging cycle life.

Further in addition, there were obtained the following findings. That is, as the rechargeable batteries obtained in Examples 1 and 2, according to their discharge capacities, they provide an energy density which is higher by 60% over that provided by a conventional rechargeable lithium ion battery in which a carbon anode is used. Therefore, the present invention makes it possible to effectively produce a high quality rechargeable battery which provides an increased energy density and has a prolonged charging and discharging cycle life.

TABLE 1

| | |
|---|---|
| cycle life* of Example 1/cycle life* of Comparative Example 1 | 2.6 |
| cycle life* of Example 1/cycle life* of Example 3 | 1.9 |
| cycle life* of Example 2/cycle life* of Example 4 | 1.3 |
| cycle life* of Example 3/cycle life* of Comparative Example 1 | 1.4 |
| cycle life* of Example 4/cycle life* of Comparative Example 1 | 1.2 |
| cycle life* of Example 5/cycle life* of Comparative Example 2 | 1.5 |
| cycle life* of Example 6/cycle life* of Comparative Example 3 | 1.7 |

*charging and discharging cycle life

TABLE 2

| | edge coating | | |
|---|---|---|---|
| | cathode | anode | electrode size |
| Example 1 | present | present | anode > cathode |
| Example 2 | none | present | anode > cathode |
| Example 3 | present | none | anode > cathode |
| Example 4 | none | none | anode > cathode |
| Example 5 | none | present | anode > cathode |
| Example 6 | none | present | anode > cathode |
| Comparative Example 1 | none | none | anode = cathode |
| Comparative Example 2 | none | none | anode = cathode |
| Comparative Example 3 | none | none | anode = cathode |

*anode > cathode: the size of anode is larger than that of cathode. anode = cathode: the size of anode is equal to that of cathode.

What is claimed is:

1. A rechargeable lithium battery comprising an anode, a separator, a cathode, a non-aqueous electrolyte or a non-aqueous electrolyte solution, and a housing, wherein:
    said rechargeable lithium battery is coin-shaped, prismatic or cylindrical;
    said cathode comprises a lithium-containing transition metal oxide;
    said anode and said cathode are positioned to oppose each other through said separator in said rechargeable lithium battery;
    each of said anode and said cathode has a plane such that said plane of said anode is opposed to said plane of said cathode;
    said anode and said cathode have a distance (d) between said plane of said anode and said plane of said cathode measured perpendicularly to the planes of said anode and said cathode;
    said anode is positioned such that a shortest distance between corresponding corresponding edges of said anode and said cathode is 10 or more times greater than said distance (d); and
    said anode has a greater area than said cathode such that a picture plane of said cathode, which is provided by vertically projecting said plane of said cathode onto said plane of said anode, is situated within said plane of said anode in order to reduce an electric field intensity at an edge portion, whereby dendrite formation is inhibited and battery life is prolonged.

2. The rechargeable lithium battery according to claim 1, wherein the anode has a coat comprising an insulating material or a semiconductor material such that a peripheral edge portion of the anode is covered by said coat but the cathode has no coat at a peripheral edge portion thereof.

3. The rechargeable lithium battery according to claim 2, wherein either the insulating material or the semiconductor material contains at least a material selected from the group consisting of organic high-molecular materials, metal oxide materials, and organic-inorganic composite materials.

4. The rechargeable lithium battery according to claim 3, wherein the organic high-molecular material contains at least a member selected from the group consisting of fluorine-containing resins and silicone resins.

5. The rechargeable lithium battery according to claim 1, wherein the cathode has a coat comprising an insulating material or a semiconductor material such that a peripheral edge portion of the cathode is covered by said coat but the anode has no coat at a peripheral edge portion thereof.

6. The rechargeable lithium battery according to claim 5, wherein either the insulating material or the semiconductor material contains at least a material selected from the group consisting of organic high-molecular materials, metal oxide materials, and organic-inorganic composite materials.

7. The rechargeable lithium battery according to claim 6, wherein the organic high-molecular material contains at least a member selected from the group consisting of fluorine-containing resins and silicone resins.

8. The rechargeable lithium battery according to claim 1, wherein the anode is designed to have a greater width and length than the cathode such that said width and length of the anode are greater by 2 times or more over the square root of the sum for the square of a positioning variability for the anode and the square of a positioning variability for the cathode.

9. The rechargeable lithium battery of claim 1 in which the battery is prismatic.

10. The rechargeable lithium battery of claim 1 in which the battery is cylindrical.

11. A rechargeable lithium battery comprising an anode, a separator, a cathode, a non-aqueous electrolyte or a non-aqueous electrolyte solution, and a housing, wherein:

said rechargeable lithium battery is coin-shaped, prismatic or cylindrical;

said anode comprises a lithium anode active material and said cathode comprises a lithium containing transition metal oxide as a cathode active material;

said anode and said cathode are positioned to oppose each other through said separator in said rechargeable battery and have a distance (d) between said anode and said cathode measured perpendicularly to a plane of said anode opposed to a plane of said cathode;

said anode is positioned such that a shortest distance between corresponding corresponding edges of said anode and said cathode is 10 or more times greater than said distance (d) between said anode and said cathode, measured perpendicularly to said anode and said cathode planes; and said anode has a greater area than said cathode such that a picture plane of said cathode, which is provided by vertically projecting said plane of said cathode onto said plane of said anode, is situated within said plane of said anode in order to reduce an electric field intensity at an edge portion of said anode, whereby dendrite formation is inhibited and battery life is prolonged.

12. A rechargeable lithium battery comprising an anode, a separator, a cathode, a non-aqueous electrolyte or a non-aqueous electrolyte solution, and a housing, wherein:

said rechargeable lithium battery is coin-shaped;

said cathode comprises a lithium-containing transition metal oxide;

said anode and said cathode are positioned to oppose each other through said separator in said rechargeable lithium battery;

each of said anode and said cathode has a plane such that said plane of said anode is opposed to said plane of said cathode;

said anode and said cathode have a distance (d) between said plane of said anode and said plane of said cathode measured perpendicularly to the planes of said anode and said cathode;

said anode is positioned such that the shortest distance between an edge of said anode and an edge of said cathode is 10 or more times greater than said distance (d); and said anode has a greater area than said cathode such that a picture plane of said cathode, which is provided by vertically projecting said plane of said cathode onto said plane of said anode, is situated within said plane of said anode in order to reduce an electric field intensity at an edge portion, whereby dendrite formation is inhibited and battery life is prolonged.

* * * * *

UNITED STATES PATENT AND TRADEMARK OFFICE
CERTIFICATE OF CORRECTION

PATENT NO.    : 6,596,432 B2
DATED         : July 22, 2003
INVENTOR(S)   : Soichiro Kawakami et al.

It is certified that error appears in the above-identified patent and that said Letters Patent is hereby corrected as shown below:

<u>Column 7,</u>
Line 4, "greater" should read -- is greater --.

<u>Column 20,</u>
Line 9, (in Table 2), "anode=" should read, -- ¶ anode= --.
Line 30, "corresponding" (second occurrence) should be deleted.

<u>Column 21,</u>
Line 26, "corresponding" (second occurrence) should be deleted.

Signed and Sealed this

Seventeenth Day of February, 2004

JON W. DUDAS
*Acting Director of the United States Patent and Trademark Office*